United States Patent

Buthker

(10) Patent No.: US 9,543,830 B2
(45) Date of Patent: Jan. 10, 2017

(54) SENSE CURRENT MEASUREMENT IN SWITCH MODE POWER CONVERTERS

(71) Applicant: NXP B.V., Eindhoven (NL)

(72) Inventor: Henricus Cornelis Johannes Buthker, Eindhoven (NL)

(73) Assignee: NXP B.V., Eindhoven (NL)

( * ) Notice: Subject to any disclaimer, the term of this patent is extended or adjusted under 35 U.S.C. 154(b) by 63 days.

(21) Appl. No.: 14/162,627

(22) Filed: Jan. 23, 2014

(65) Prior Publication Data

US 2014/0225585 A1    Aug. 14, 2014

(30) Foreign Application Priority Data

Feb. 8, 2013 (EP) .................................... 13154564

(51) Int. Cl.
G05F 1/44 (2006.01)
H02M 3/156 (2006.01)
H02M 1/00 (2006.01)

(52) U.S. Cl.
CPC ....... H02M 3/156 (2013.01); *H02M 2001/008* (2013.01); *H02M 2001/0009* (2013.01)

(58) Field of Classification Search
CPC .. H02M 3/158; H02M 2001/009; G05F 1/563; Y10T 307/469
USPC ............... 323/209, 222, 266–268, 282–289, 299,323/351
See application file for complete search history.

(56) References Cited

U.S. PATENT DOCUMENTS

| | | | |
|---|---|---|---|
| 5,414,341 A * | 5/1995 | Brown ..................... | G05F 1/563 323/259 |
| 6,366,068 B1 | 4/2002 | Morishita | |
| 6,522,110 B1 * | 2/2003 | Ivanov .................... | G05F 1/577 307/39 |
| 6,954,054 B2 * | 10/2005 | Brown .......................... | 323/283 |
| 7,230,406 B2 * | 6/2007 | Huang ................ | H02M 3/1584 323/222 |
| 7,245,116 B2 * | 7/2007 | Tateno ................ | H02M 3/1588 323/314 |
| 7,583,066 B2 * | 9/2009 | Tolle ................... | H02M 3/1582 323/222 |
| 7,592,791 B2 * | 9/2009 | Emira ................... | H02M 3/158 323/283 |
| 8,299,579 B2 | 10/2012 | Patti et al. | |
| 2004/0135562 A1 * | 7/2004 | Oden .................... | H02M 3/158 323/282 |

(Continued)

FOREIGN PATENT DOCUMENTS

| | | |
|---|---|---|
| CN | 1265479 A | 9/2000 |
| EP | 0 933 865 A1 | 8/1999 |
| EP | 1 489 730 A2 | 12/2004 |

OTHER PUBLICATIONS

Extended European Search Report for EP Patent Appln. No. 13154564.2 (Aug. 6, 2013).

*Primary Examiner* — Rajnikant Patel

(57) ABSTRACT

A switch mode power converter configured for operation with a plurality of outputs is disclosed. The switch mode power converter includes an inductive element and a resistance in series with the inductive element. The resistance is series with the inductive element is used for determining a current through the inductive element. The resistance is a resistance between the main terminals of a switch in an on-state. The switch have two main terminals and a control terminal and being arranged for directing current through the inductive element to a one of the plurality of outputs.

5 Claims, 3 Drawing Sheets

(56) References Cited

U.S. PATENT DOCUMENTS

2007/0194828 A1     8/2007  Patti et al.
2011/0181323 A1     7/2011  Patti
2013/0082668 A1*    4/2013  Tseng .................... H02M 3/158
                                                        323/267

* cited by examiner

SENSE CURRENT MEASUREMENT IN SWITCH MODE POWER CONVERTERS

CROSS-REFERENCE TO RELATED APPLICATIONS

This application claims the priority under 35 U.S.C. §119 of European patent application no. 13154564.2, filed on Feb. 8, 2013, the contents of which are incorporated by reference herein.

FIELD OF THE INVENTION

This invention relates to switched power converters and to methods of operating switched mode power converters.

BACKGROUND OF THE INVENTION

In many switch mode power converters, it is necessary or desirable to measure a current through an inductive element in the power converter.

In conventional switch mode power converters, measurement of this current is achieved by means of a sense resistor, located in series with the inductive element. The sense resistor is usually a separate component, and typically has a relatively low resistance of the order of 0.01 to 1 ohms, in order to minimise associated resistive losses. Nonetheless, and particularly for relatively low power outputs, these losses are undesirable.

One known solution to this problem is to position the sense resistor on the input side of the switch mode converter, in series with a power switch. Although positioning the resistance in series with the switch will cause lower losses, it may introduce other problems, particularly those associated with high-voltage operation. In order to determine the currents from the sense resistor, a current sense amplifier such as a trans-impedance amplifier is connected across the sense resistor: if the converter has a high input voltage, the current sense amplifier input needs to withstand that voltage, and also has two withstand any noise on the input supply line. A level shifter may be required in order to bring the output voltage of the amplifier down to ground level. Furthermore, any ringing on the switching node may introduce ringing at the current sensor, which may place a further high demand on the current sense amplifier.

A further, known, solution is to measure the voltage drop across the on-state drain-source resistance (Rdson) of the power switch, typically a high side switch in the case of a half bridge converter. However, such a solution is difficult to implement, and there is an ongoing need for an alternative solution.

SUMMARY OF THE INVENTION

According to a first aspect there is disclosed a switch mode power converter configured for operation with a plurality of outputs and comprising: an inductive element, and a resistance in series with the inductive element and being for determining a current through the inductive element, wherein the resistance is a resistance between the main terminals of a switch in an on-state, the switch having two main terminals and a control terminal and being arranged for directing current through the inductive element to a one of the plurality of outputs.

By sensing the voltage across the switch in its on-state, and with knowledge of the switch's "on-resistance" Rds-on, the current through the switch may be directly determined, and it may be possible to avoid the requirement for a separate sense resistor together with the ohmic loss associated therewith.

In embodiments, the switch is a relatively low power reference switch, either being configured for operation in parallel with and in synchronisation with or being a part of a relatively high power power switch. The effects of variation in Rds-on, caused either by temperature variation, or variation in other operating conditions, which are known to occur in high power power switches, may thus be avoided or reduced.

In embodiments, the relatively high power power switch is arranged for directing current through the inductive element to a one of the plurality of outputs. In embodiments, the switch mode power converter further comprises an amplifier connected across the main terminals of the switch, for determining a current through the switch from the voltage across the main terminals.

According to another aspect there is provided a solar inverter comprising a switch mode power converter as claimed in any preceding claim. Solar inverters are one application in which the invention may be used, although the skilled person will appreciate that the invention is not limited thereto.

According to a further aspect, there is provided a method of operating a switch mode power supply having an inductive element and a plurality of outputs, the method comprising directing current through the inductive element to a one of the plurality of outputs by means of a switch having two main terminals and a control terminal, and determining a current through the inductive element by measuring a resistance in series with the inductive element, wherein the resistance is a resistance between the main terminals of the switch in an on-state.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
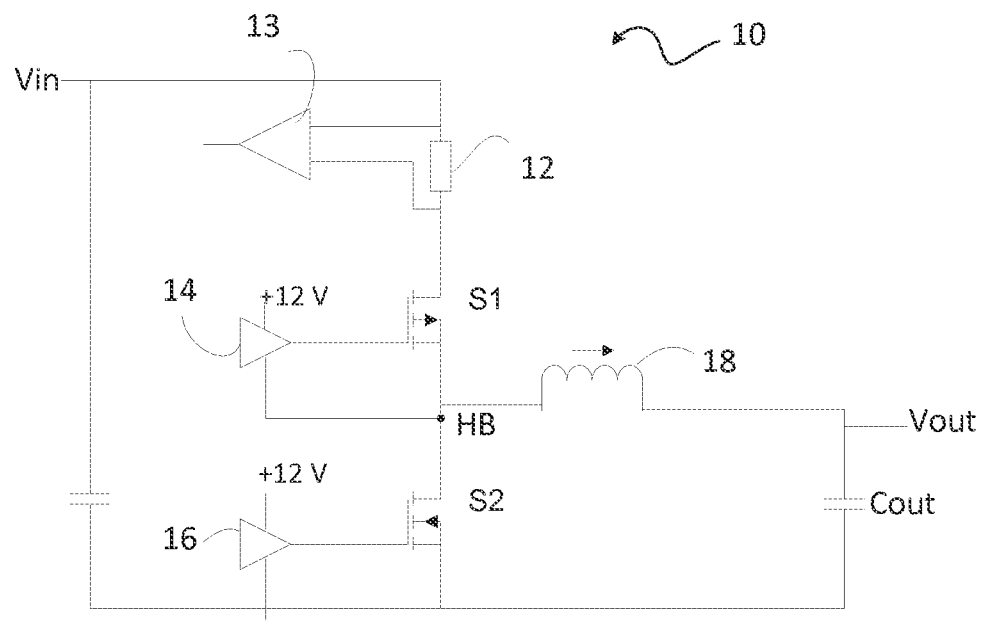
FIG. 1 illustrates a half bridge converter having input side current sensing by means of a series resistor in series with the high side switch.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 illustrates a conventional half bridge converter 10 having input side current sensing by means of a series resistor in series with the high side switch. The converter comprises a high side switch S1, and a low side switch S2 connected in series with a half bridge node page be there between. The switches are connected across an input voltage Vin, with a sense resistor 12 between the high side switch and the input rail. A current sense amplifier, or transimpedance amplifier, 13 is connected across the sense resistor 12 An input capacitance Cin is also connected across the input. High side switch S1 and low side switch S2 are controlled by means of drivers 14 and 16 respectively. On the output side is an inductor 18, connected between the half bridge node HB and the output Vout. A output capacitor Cout is also connected across the output.

Figure 2:
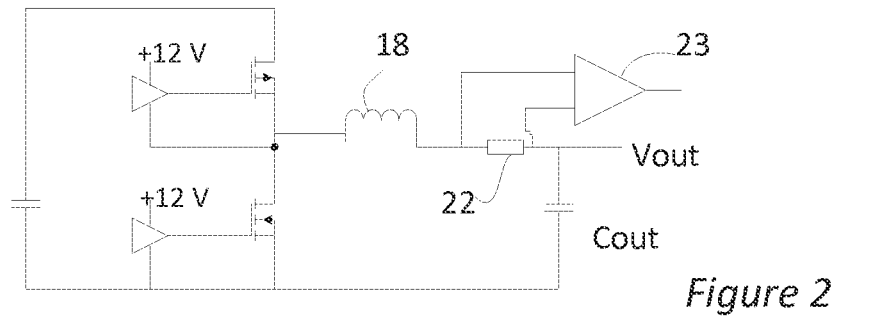
FIG. 2 illustrates a half bridge converter having a sense resistor in series with the inductor.

FIG. 2 illustrates a half bridge converter 20 having a sense resistor in series with the inductor. This converter is similar to that shown in FIG. 1, except that the current through the inductor 18 is sensed by means of a sense resistor 22 connected between the inductor 18 and the output rout, similarly to the sense resistor shown in FIG. 1, and a current sense amplifier 23 is connected across the sense resistor.

Figure 3:
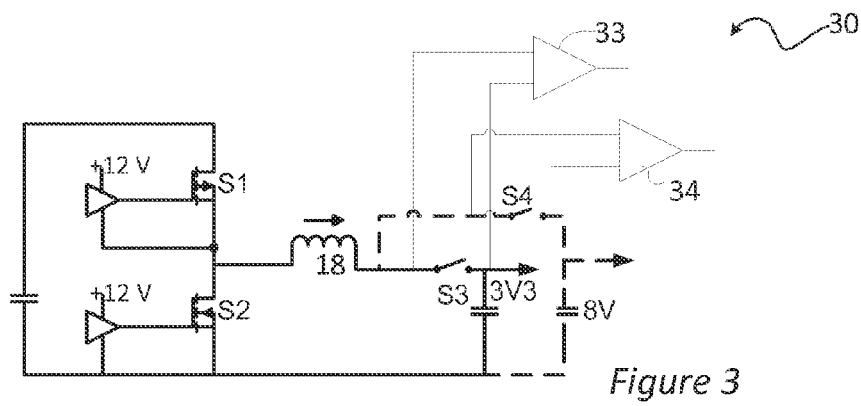
FIG. 3 shows an example of a multi-output down converter according to embodiments.

FIG. 3 shows, in schematic form, an example of a multi-output down converter 30 according to embodiments. Similarly to the converter shown in FIGS. 1 and 2, this converter is a half bridge converter having switches S1 and S2 with a half bridge node of therebetween. However, the current through the inductor 18 may be directed to one or other of two outputs, shown as a first output at 3.3 V, and a second output at 8V. The outputs are connected to ground by respective capacitors Cout1 and Cout2. The inductor current is routed to the respective outputs by means of first output switch S3 and second output switch S4. According to embodiments, a separate sense resistor is not included in the circuit; rather a current sense amplifier 33 is connected directly across the switch S3. Further, a second sense current amplifier 34 is connected across the second output switch S4. Advantageously, the losses associated with a separate sense resistor are avoided. Rather, when switch S3 is closed, the current sense amplifier 33 measures the finite voltage drop across the switch S3, and provided that the switch resistance Rswitch is known, the current through the switch, and thus the current through the inductor 18 (when S3 is closed), can be calculated. Similarly, when switch S4 is closed the current sense amplifier 34 measures the finite voltage drop across the switch S4, and provided that the switch resistance Rswitch is known, the current through the switch, and thus the current through the inductor 18 (when S4 is closed), can be calculated.

Generalising from the example shown in FIG. 3, if a buck converter has more than one output, it will have multiplexing switches, one per output on the output side. Normally only one switch will be closed at a time, directing the inductor current to the output corresponding to that switch. Whenever the switch is closed, the voltage across it will be a measure for the current through it. Thus there is no need for separate sense resistors, and this advantageously may increase efficiency and reduce cost and/or space on the circuit board. Furthermore, since the switches are on the output side of the circuit, they will generally be at a low and DC voltage level so, no specific requirements relating to high-voltage capability is placed on the sense amplifiers, which may thus be lower cost components.

Figure 4:
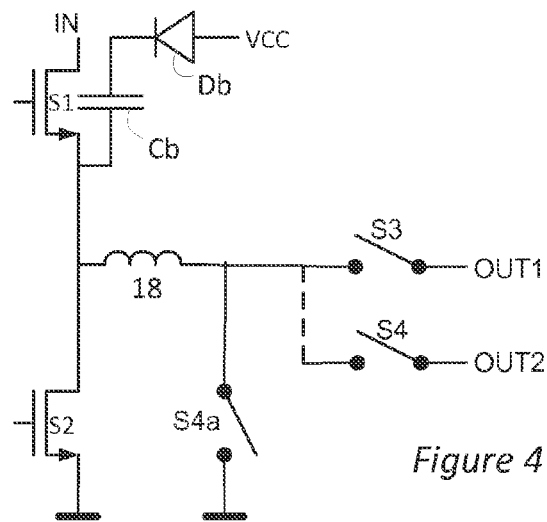
FIG. 4 shows an example of a buck converter operable according to embodiments.
Figure 5:
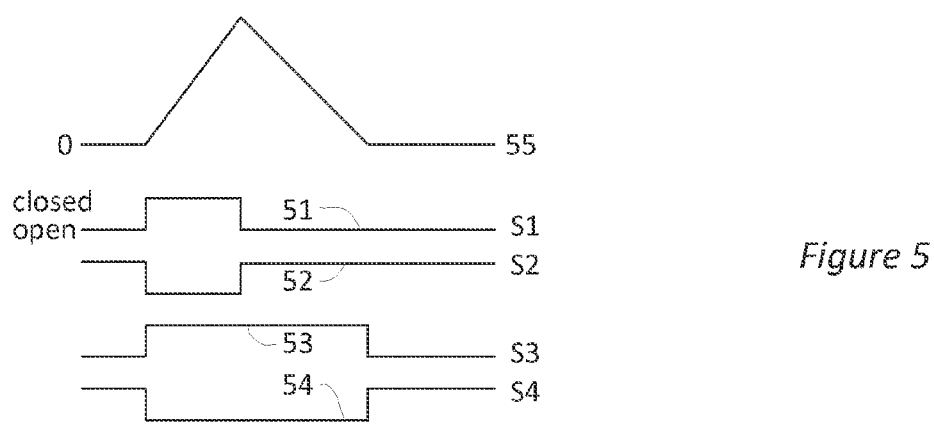
FIG. 5 shows timing diagram of the inductor current and switches of FIG. 4.

FIG. 4 shows an example of a buck converter 40 operable according to embodiments and FIG. 5 shows timing diagram of the inductor current and switches of FIG. 4. Similarly to the circuit shown in FIG. 3, the buck converter 40 has an input IN connected across two switches S1 and S2 with a half bridge node therebetween. An inductor 18 is connected to the half bridge node, and the output from the inductor is directed towards one or other of two outputs OUT1 one and OUT2 by means of switches S3 and S4 respectively. Also shown is a separate switch S4, which connects the output of the inductor 18 to ground and may be used to avoid ringing, and a bootstrap arrangement of a diode Db and capacitor Cb, connecting a supply voltage Vcc to the half-bridge node in order to generate a floating supply for the high-side switch S1, as will be familiar to the skilled person.

In FIG. 5, the timing diagram, for a buck converter 40 as shown in FIG. 4 operated in discontinuous conduction mode (DCM) is shown. The traces show the inductor current 55, the open/closed status of switches S1 and S2 at 51 and 52 respectively, and the open/closed statuses of switches S3 and S4 at 53 and 54. When S1 is closed, the inductor current will increase. S1 turns off and S2 turns on, so the inductor current decreases again. When it reaches zero, S3 or S4 can change state. After that, a new cycle can start. The inductor current is flowing through either S3 or S4. S4$a$ is an optional switch that can be closed if both S3 and S4 are open, to prevent ringing at the right side of the inductor. If S4$a$ is closed, S2 has to be closed as well.

Figure 6:
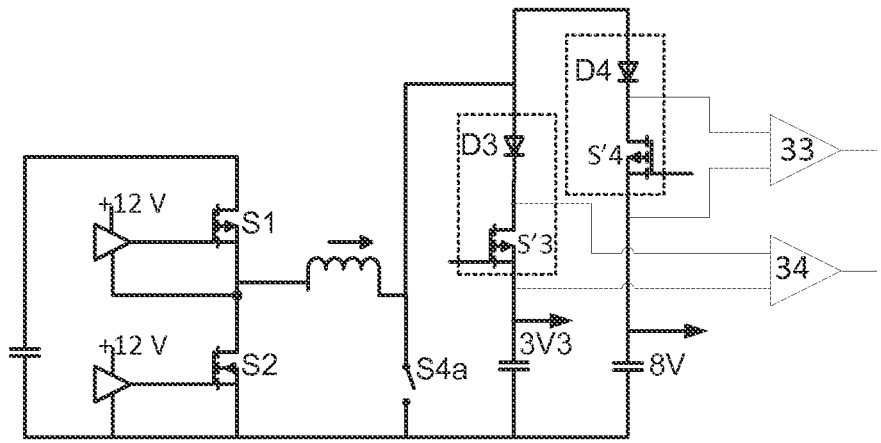
FIG. 6 shows a dual output buck converter according to embodiments.
Figure 7:
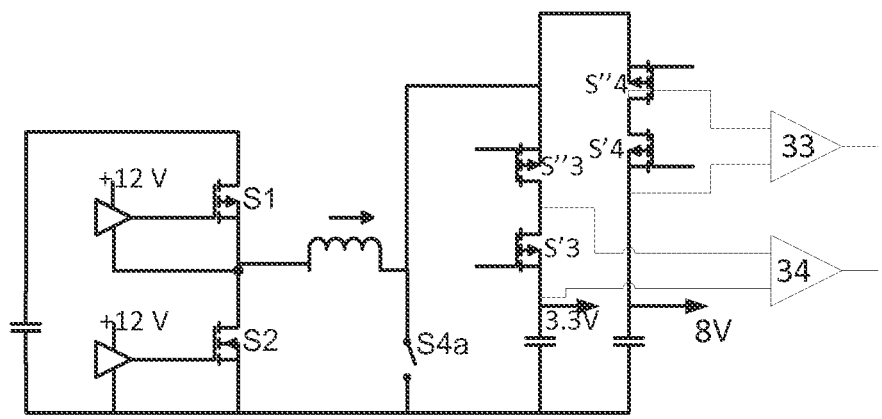
FIG. 7 shows a dual output but converter according to other embodiments.

FIG. 6 shows a dual output buck converter according to embodiments. In this embodiment switch S3 is implemented as a series connection of diode D3 and NMOS S'3, and switch S4 is implemented as a series connection of diode D4 and NMOS S'4. The current sense amplifiers measure the voltage across the switches S'3 and S'4, rather than the respective switch-diode pair D3+S'3, D4+S'4. Optional switch S4$a$ may be a simple NMOS. In other embodiments, such as that shown in FIG. 7, diode D3 and D4 may be replaced by separates FETs S"3 and S"4, either NMOS or PMOS, to further reduce the losses. FIG. 7 is otherwise similar to FIG. 6. The skilled person would appreciate that the diode D3 and D4 (or switches S"3 and S"4) are generally required in multiple output buck converters, in order to avoid unintentional currents in the wrong direction. The skilled person further appreciated the output with the lowest voltage does not require such a diode.

The skilled person will be familiar that if switches are directly used as sense resistors, there may be a large influence of temperature and process spread on the measured voltage, which may impact the accuracy of the current sensing. However, the skilled person will equally appreciate that such influences might be mitigated by using a part of the switch, as a reference switch, or indeed providing a higher currents power switch in parallel and to operate agree with the switch S3 or S4 respectively. Such a reference switch integrated into a higher power switch is known, for instance from United States patent application publication number US2011/0181323.

Power converters employing such switches for current sensing may be used in a wide range of applications, including without limitation solar inverters and uses in automotive fields, as examples of higher voltage applications, and mobile applications such as cell-phones and smart-phones as examples of—typically—lower voltage applications.

From reading the present disclosure, other variations and modifications will be apparent to the skilled person. Such variations and modifications may involve equivalent and other features which are already known in the art of current sensing in power converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A switch mode power converter configured for operation with a plurality of outputs and comprising:
   an inductive element; and
   a plurality of switches in series with the inductive element, the plurality of switches arranged for directing current through the inductive element to a one of the plurality of outputs, each switch of the plurality of switches having two main terminals and a control terminal;
   a plurality of amplifiers, at least one amplifier connected across the main terminals of each switch, for determining a current through the respective switch from the voltage across the main terminals of the respective switch.

2. A switch mode power converter as claimed in claim 1, wherein the switches are relatively low power reference switches, either being configured for operation in parallel with and in synchronisation with or being a part of relatively high power power switches.

3. A switch mode power supply as claimed in claim 2, wherein the relatively high power power switches are arranged for directing current through the inductive element to one of the plurality of outputs.

4. A solar inverter comprising a switch mode power converter as claimed in claim 1.

5. A method of operating a switch mode power supply having an inductive element and a plurality of outputs, the method comprising
   directing current through the inductive element to one of the plurality of outputs by means of a plurality of switches, each switch having two main terminals and a control terminal; and
   determining a current through the inductive element by measuring a resistance in series with the inductive element,
   wherein the resistance is a resistance between the main terminals of one of the plurality of switches when the switch is in an on-state.

* * * * *